Inventors:
Wilhelm Gregor
Bernard Jongji

United States Patent Office 3,302,922
Patented Feb. 7, 1967

---

3,302,922
DUALLY EFFECTIVE HYDRAULIC VALVE
Wilhelm Gregor, Hamburg-Neugraben, and Bernhard Jorgji, Hamburg-Lokstedt, Germany, assignors to Licentia Patent-Verwaltungs-G.m.b.H., Frankfurt am Main, Germany
Filed Feb. 13, 1964, Ser. No. 344,697
Claims priority, application Germany, Feb. 13, 1963,
L 44,109
3 Claims. (Cl. 253—1)

The present invention relates generally to the valve art, and, more particularly, to a valve for use in a hydraulic system and between a hydraulic pump and a hydraulic motor.

Frequently, in hydraulic systems having closed flow paths the power for driving the hydraulic motor or secondary part is not only delivered by the pump or primary part but also by the load which is effective upon the motor. For example, when lowering a hydraulic jack device, the load will be effective on the motor.

If two pumps connected in parallel with each other are used in a hydraulic system and one of them is used as a reserve or spare, as is customary particularly in ship steering devices, the stroke of the two pumps in most cases is adjusted jointly even if only one of the pumps is in operation. However, a situation may arise wherein the pump which is not mechanically actuated at the time operates as a hydraulic motor as soon as there is pressure on one side of the system, which would cause an undesired short circuit of the hydraulic motor which is to be driven. Thus, the operation of a ship steering device in such an arrangement would be impossible.

In order to eliminate these deficiencies, manually operated valves or electrically actuated distributing slide valves or servo pistons have been provided in the pressure lines. However, manually operated valves do not permit for remote actuation and deactuation of pump assemblies. In electrically actuated magnetic slide valves it is not always certain that they will fully open and fully close the lines in which they are disposed because in many cases they are switched only rarely and this is particularly true in ship steering mechanisms. This encourages faulty operation or even jamming of the slides of the valve.

The reversal of a pump set into operation can also be prevented by means of an element which prevents coasting or free-wheeling, as, for example, a locking pawl which permits rotation of the pump only in the normal operating or drive direction. By means of such an arrangement the undesired reversal of the hydraulic motor is also prevented; however, there is the danger that the pump will be driven in its normal driving direction of rotation when a load is lowered by a jack device for example, or in returning the rudder of a steering device from a set position into its middle or neutral position.

Such pumps begin operation at relatively small stroke volumes when there are still substantial quantities of pressure medium capable of being added from the load so that the pump may attain uncontrollably high angular speeds which may easily damage the bearing and sliding or working surfaces.

Thus, attempts have been made to use controlled nonreturn valves or relief valves. However, such valves are unstable and flutter if the load drives in the same direction as the motor, as in lowering of a load.

With these defects of the prior art in mind, it is a main object of the present invention to provide a controlled dually effective valve arrangement for a hydraulic power system.

Another object of the invention is to provide a device of the character described which eliminates undesired reactive effects on pumps and motors in a closed hydraulic power flow path system.

A further object of the invention is to provide a device of the character described which is relatively simple and compact in construction.

These objects and others ancillary thereto are accomplished with preferred embodiments of the invention wherein a valve is provided which may be connected with each pump of the assembly and wherein for each feeding and for each discharge line a main passage is provided which may be sealed by a spring valve. In addition, a secondary passage which is parallel thereto is provided and which may be sealed by a distributing slide valve.

As one feature of the invention two distributing slide valves may be arranged at the ends of a recoil or displacement cylinder which is open at its ends and is provided with a recoil or displacement piston in its center. The two slide valves are displaceably mounted in their cylinder chambers. In its blocking position, each slide valve blocks a radical bore in the recoil cylinder or in an enlargement of the recoil cylinder. This bore leads to one side of the device and in its open position it opens the path for a flow connection between the radial bore and the other side of the line and this is accomplished by a passage opening which then is provided at the end face of the recoil cylinder.

Additional objects and advantages of the present invention will become apparent upon consideration of the following description when taken in conjunction with the accompanying drawings in which.

Figure 1:
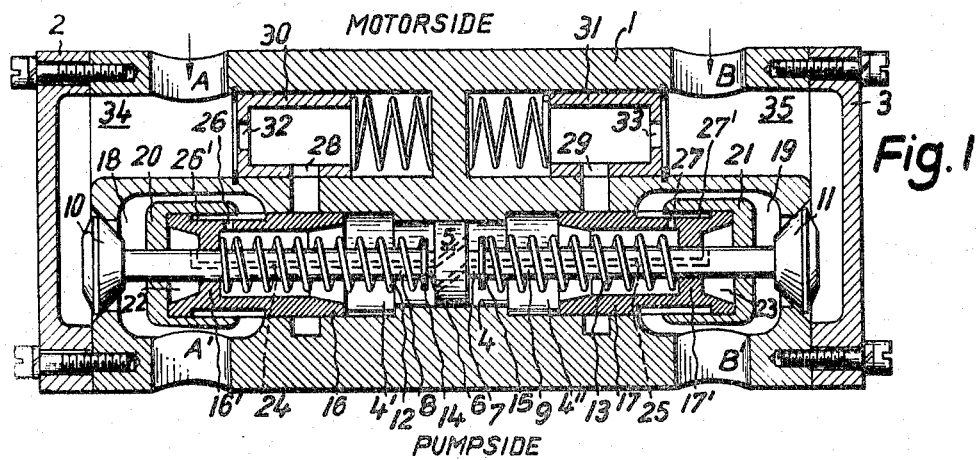
FIGURE 1 is a longitudinal sectional view through the present invention.

Prior to considering the drawings in detail, it should be noted that a feature of the invention provides two control arrangements constructed in mirror image symmetry to each other each providing for control of flow therethrough for a different line and these arrangements are provided in a common housing.

The valve system may be provided by cylindrical hollow control slide valves which have radial walls therein. The respective outer ends of the slide valves each slide within a pot or cup-shaped portion of the housing which is in communication with the cylinder chamber. A space is provided therebetween, and the housing portion is surrounded by pressure oil. Bores are provided through the shells of these sliding valves and are disposed in the portion of the slide valve which opens in the direction of the cylinder chamber. These bores are always connected with one side of their resepective lines. The portions of the slide valves which open in the direction toward the cup-shaped housing portions form chambers therewith and by means of the bores these chambers are in communication with the spaces of the cylinder chambers which are disposed behind the recoil piston.

As another feature of the invention, the recoil piston is provided with a piston rod on both sides which slides in two, at least partially, hollow valve rods. The bore leading from the chamber in the cup-shaped housing portion into the space behind the recoil piston extends through the valve rod, the piston rod, and the recoil piston.

As a further feature of the invention a volume governor which is known per se may be connected on the motor side of the device and the front of the secondary passage.

With more particular reference to the drawings, a valve housing 1 is provided having end covers 2 and 3. The valve housing 1 is provided with an inlet A and an outlet B on the motor side of the device and is also provided with an inlet A' and an outlet B' on the pump side of the device. The housing is provided with two identical control mechanisms which are arranged in mirror image symmetry with respect to the central cross sectional plane of the device.

A recoil cylinder 4 which is open on both sides is disposed within the housing 1 and is provided with cylinder chambers 4' and 4" on the left and right sides of the cylinder, respectively. A recoil piston 5 is disposed in cylinder 4. This piston 5 is provided with piston rods 6 and 7 each on one side, respectively, and these piston rods are disposed within hollow valve rods 8 and 9, respectively, of spring valves 10 and 11. The springs 12 and 13 of these valves abut against collars 14 and 15 on one respective end at the ends of the valve rods 8 and 9, and abut against radial intermediate walls 16' and 17' at their other respective ends. These walls are provided in hollow slide valves 16 and 17. The valve rods 8 and 9 are mounted for movement in the intermediate walls 16' and 17'.

The ports A' and B' which are disposed on the pump side of the device extend into and communicate with cylindrical pump chambers 18 and 19, respectively. In the center of each of these chambers a pot or cup-shaped housing portion 20 and 21, respectively, is provided. A part of the cylindrical interior of these housing portions 20 and 21 together with respectively one of the slide valves 16 and 17, forms the secondary chambers 22 and 23, respectively. A bore 24 is disposed through the piston and valve rods so as to provide communication between chamber 22 and cylinder chamber 4" whereas another bore 25 provides communication between chamber 23 and cylinder chamber 4'.

The slide valves 16 and 17 are provided near the outer ends thereof with a wide annular groove 26' and 27' respectively, and they have bores 26 and 27, respectively, which place the annular grooves into communication with the respective cylinder chambers 4' and 4". Each of the slide valves 16 and 17 is disposed in front of and therefore normally blocks or seals cylinder bores 28 and 29 which, respectively, are connected with volume governors 30 and 31. The end openings 32 and 33 of the governors 30 and 31 are in communication with motor chambers 34 and 35 of the housing 1. These motor chambers communicate with the motor inlet and outlet A and B, respectively, and are separated from pump chambers 18 and 19 to which the motor inlet and outlet A' and B', respectively, are connected, by means of the spring valves 10 and 11. When these valves are closed they prevent flow between these chambers.

FIGURE 1 illustrates the valve assembly when the pump side is not under pressure and the motor side is under pressure. In this case the oil pressure can not influence the pump side since the valves 10 and 11 are pressed more firmly onto their seats and the slide valves 16 and 17 are closed. The hydraulic power flow system is thus interrupted.

Figure 2:
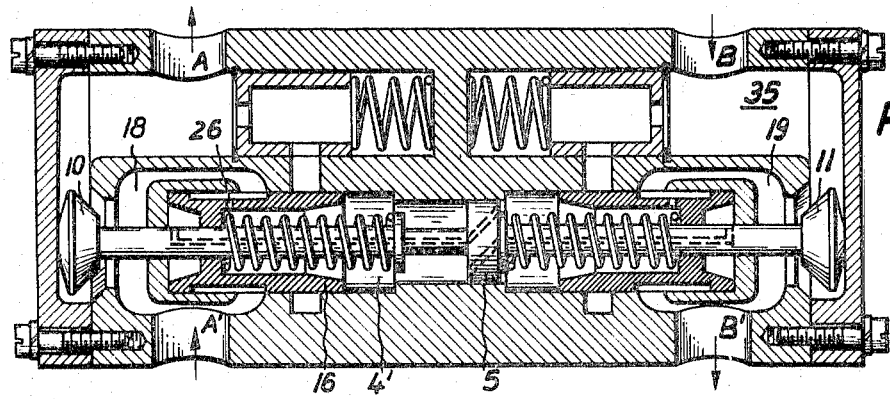
FIGURE 2 is a longitudinal sectional view similar to FIGURE 1 illustrating one position of the valve.

In FIGURE 2 it is assumed that one pump is in operation and that oil entering at A' is under pressure. Due to this oil pressure, the spring valve 10 opens and the oil enters pump chamber 18 and cylinder chamber 4'. The oil passes through the bore 26 of the slide valve 16 and forces the recoil piston 5 toward the right as shown in FIGURE 2. This engages and thus opens the spring valve 11. The hydraulic fluid which flows from the motor passes through port B and into the motor chamber 35 through the opening in the valve seat of valve element 11 and into the pump chamber 19 and then through port B' into the return line to the pump. The hydraulic system flow path is thus completed.

Figure 3:
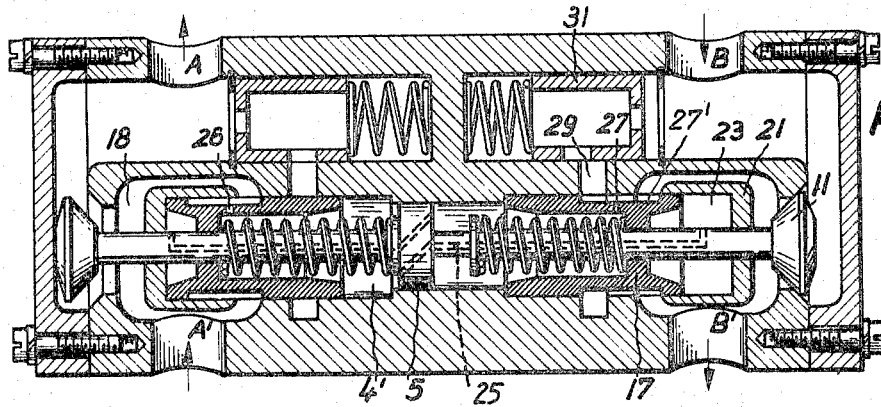
FIGURE 3 is a longitudinal sectional view similar to FIGURE 1 showing another position of the valve.

FIGURE 3 illustrates one of the conditions which the valve assumes if the hydraulic motor is subjected to additional pressure with the pump operating, as, for example, when lowering a load.

Under these conditions the pressure increase at port B corresponds to a relative pressure decrease at ports A' and A. Because of the connection and communication between pump chamber 18 with the cylinder chamber 4' by means of the bore 26, a relative pressure decrease is also provided in cylinder chamber 4'. This results in a shift of the recoil piston 5 toward the left and oil from the cylinder chamber 4' is displaced into the right-hand chamber 23 by passing through the bore 25. Due to the oil pressure thereby provided in chamber 23, the slide valve 17 moves to the left and the bore 29 is opened and the secondary passage is opened by means of the annular groove 27'. Thus, the oil can flow through port B, through the volume governor 31, through bore 29, through annular groove 27', into pump chamber 19, around the cup-shaped housing part 21, and through the port B'. The quantity of oil flowing through the system is regulated in dependence upon the oil pressure in a manner which is known per se by means of the volume governor 31. When the oil pressure becomes too great, the volume governor can also completely block flow through the oil passage.

As the pressure on the motor side diminishes, the slide valve 17 again closes this secondary passage and the main passage via valve 11 is opened. The cross sections of the flow passages of the valve system are matched with one another so that in none of the conditions to which the valve may be subjected will the motor or the pump be subjected to undesired stresses.

Figure 4:
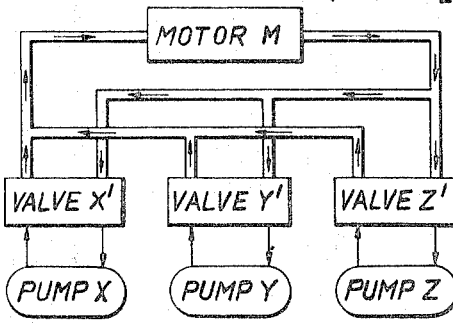
FIGURE 4 is a diagrammatic view illustrating a hydraulic system which includes a plurality of pumps and valves and a single motor.

Two or more pumps may be connected in parallel as shown, for example, in FIGURE 4, wherein pumps x, y, and z are provided with valves x', y', and z', respectively, of the type described above, and are connected with a motor M. Each of the pumps can be individually set into operation and connected into the hydraulic flow path. This guarantees that a pump is provided which will not be actuated as a motor because of the oil pressure of the pump which is in operation, and therefore the motor which is used for performing work will not be hydraulically short-circuited.

It will be understood that the above description of the present invention is susceptible to various modifications, changes, and adaptations, and the same are intended to be comprehended within the meaning and range of equivalents of the appended claims.

What is claimed is:

1. In a valve arrangement which is controlled and dually effective and disposed in the inlet and outlet lines of a closed hydraulic power flow path system, the improvement comprising means defining a main passage for each line, a spring valve associated with each main passage for sealing this main passage, means defining a recoil cylinder opened at the ends and having a recoil piston in the center thereof, means defining a secondary passage for each line parallel to the main passage and including a radial bore leading from the recoil cylinder to a line on one side thereof, a slide valve for each secondary passage for sealing the secondary passage, the two slide valves being provided each at one end respectively of said recoil cylinder and being displaceable in said cylinder, each slide valve being displaceable into a blocking position blocking the radial bore in the recoil cylinder and into an open position establishing communication between the radial bore and the other side of the line by means of a flow passage which is then defined at the end face of the recoil cylinder, a common housing in which two control arrangements are provided for each flow passage and for each line to be controlled and which are disposed in mirror image symmetry to each other, said slide valves being hollow and cylindrical and being provided interiorly thereof with a radial wall, the outer ends of the slide valves being disposed for sliding movement within a portion of the housing which is connected to and spaced from the recoil cylinder, said housing portion being pot-shaped and surrounded by pressure oil, a bore disposed through each slide valve and always in communication with one side of the line and leading into the portion of the slide valves which is opened toward the recoil cylinder, the slide valve having a portion which is opened toward the pot-shaped housing portion to define a chamber therewith which is connected with the space of the recoil cylinder which is then disposed on the opposite side of the recoil piston, said recoil piston being provided with a piston rod on both sides, and two hollow valve rods being provided in which said piston rod slides, and a bore leading from one chamber up to the space behind the recoil piston passing through said valve rod and said recoil piston.

2. An arrangement as defined in claim 1 wherein a volume governor is connected on the motor side in front of said secondary passage.

3. A hydraulic system, comprising, in combination:
(A) hydraulic motor means having an inlet and an outlet;
(B) hydraulic pump means having pressure and return lines connected to said inlet and said outlet respectively so as to define a closed flow path hydraulic system; and
(C) valve means disposed to control flow between said inlet and outlet and said pressure and return lines, said valve means including
   (1) a hollow valve body having a recoil cylinder, a cylinder chamber on each side of said recoil cylinder, two pump chambers each in communication with a cylinder chamber and one in communication with said pressure line and the other in communication with said return line, two motor chambers each in communication with a pump chamber via a valve seat aligned with the cylinder chamber, and one in communication with said inlet and the other in communication with said outlet, a radial bore formed through each cylinder chamber to communicate said chamber with the respective motor chambers,
   (2) a recoil piston disposed in said recoil cylinder and having a piston rod extending from each end thereof,
   (3) valve rods connected with and on either side of said recoil piston and passing through said cylinder chambers and said pump chambers respectively and having a valve element on the end thereof which is disposed to fit in said valve seat and block communication between the pump chambers and the motor chambers, and connected to be moved off the valve seat by said piston rod and valve rod when said recoil piston is moved,
   (4) a pot-shaped housing portion disposed within each pump chamber and opening toward the cylinder chamber, and
   (5) a hollow slide valve disposed in each cylinder chamber and having a radial wall which forms two internal spaces within each valve, with the valve rods passing through said wall, and said slide valve being disposed within said housing portion whereby the space which faces the housing portion defines a chamber therewith, a bore formed through said valve rod, said piston rod, and said piston whereby the chamber formed by the housing portion and the slide valve on one side of the recoil piston communicates with the space on the other side of said piston, said slide valve being mounted to normally block said radial bore but being slidably movable whereby said bore can provide a secondary path of communication between the motor chamber and the pump chamber even when said valve element is yet seated in said valve seat.

References Cited by the Examiner
UNITED STATES PATENTS
3,145,734  8/1964  Lee et al. _____ 137—596.13

MARTIN P. SCHWADRON, *Primary Examiner.*
SAMUEL LEVINE, *Examiner.*
E. A. POWELL, JR., *Assistant Examiner.*